US009933561B2

(12) United States Patent
Fan (10) Patent No.: US 9,933,561 B2
(45) Date of Patent: Apr. 3, 2018

(54) LIQUID CRYSTAL DISPLAY AND BACKLIGHT MODULE THEREOF (71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 246 days.

(21) Appl. No.: 14/784,706

(22) PCT Filed: Sep. 21, 2015

(86) PCT No.: PCT/CN2015/090128
§ 371 (c)(1),
(2) Date: Oct. 15, 2015

(87) PCT Pub. No.: WO2017/028358
PCT Pub. Date: Feb. 23, 2017

(65) Prior Publication Data
US 2017/0254949 A1 Sep. 7, 2017

(30) Foreign Application Priority Data
Aug. 18, 2015 (CN) .......................... 2015 1 0508239

(51) Int. Cl.
F21V 7/04 (2006.01)
F21V 8/00 (2006.01)
G02F 1/1368 (2006.01)
(52) U.S. Cl.
CPC ......... *G02B 6/0078* (2013.01); *G02B 6/0026* (2013.01); *G02B 6/0036* (2013.01);
(Continued)

(58) Field of Classification Search
CPC .. G02B 6/0078; G02B 6/0056; G02B 6/0053; G02B 6/0068; G02B 6/0088;
(Continued)

(56) References Cited

U.S. PATENT DOCUMENTS

2005/0162869 A1* 7/2005 Kanatsu ............ G02F 1/133604
362/632
2006/0114569 A1* 6/2006 Capaldo ............... G02B 5/0221
359/619
(Continued)

FOREIGN PATENT DOCUMENTS

KR     20160145880 A  * 12/2016  .......... G02B 6/0031
WO  WO 2014208385 A1 * 12/2014  ....... G02F 1/133308

OTHER PUBLICATIONS

Machine English Translation of KR20160145880A Dec. 2016.*

*Primary Examiner* — Anh Mai
*Assistant Examiner* — Glenn Zimmerman
(74) *Attorney, Agent, or Firm* — Andrew C. Cheng (57) ABSTRACT The present invention proposes an LCD and a backlight module thereof. A combinational backlight unit is arranged on a lower portion inside a bezel. The combinational backlight unit includes sub-backlight units spliced at intervals. An optical component is arranged on an upper portion inside the bezel and placed on top of the combinational backlight unit at intervals. Dot pattern reflectors are arranged on top of the gap between the adjacent sub-backlight units for reducing reflectivity of light at the gap. The backlight module used in the LCD lessens the difficulty in bending the LGP in the display with a large curve screen, so that a QD tube is suitable for a display with an extremely large size and improving the brightness and contrast of high backlight.

13 Claims, 4 Drawing Sheets (52) U.S. Cl.
CPC ......... *G02B 6/0051* (2013.01); *G02B 6/0053* (2013.01); *G02B 6/0056* (2013.01); *G02B 6/0068* (2013.01); *G02F 1/1368* (2013.01)

(58) Field of Classification Search
CPC .. G02B 6/0026; G02B 6/0051; G02B 6/0036; G02F 1/1368
USPC ........................ 362/97.1, 97.2, 97.3, 19, 616
See application file for complete search history.

(56) References Cited

U.S. PATENT DOCUMENTS

| | | | |
|---|---|---|---|
| 2008/0101068 A1 | 5/2008 | Kitamura et al. | |
| 2009/0231835 A1* | 9/2009 | Roberts | G02F 1/133608 362/97.3 |
| 2010/0165253 A1* | 7/2010 | Jung | G02B 6/0088 349/65 |
| 2010/0283718 A1* | 11/2010 | Choi | G02B 6/0068 345/102 |
| 2011/0109839 A1 | 5/2011 | Zhu et al. | |
| 2011/0235308 A1* | 9/2011 | Kang | G02B 6/0068 362/97.2 |
| 2011/0242794 A1* | 10/2011 | Nakamura | G02F 1/133615 362/97.1 |
| 2011/0273864 A1* | 11/2011 | Izawa | C09K 11/7741 362/84 |
| 2013/0021818 A1 | 1/2013 | Baek et al. | |
| 2013/0021819 A1* | 1/2013 | Wang | G02B 6/0038 362/607 |
| 2013/0044509 A1 | 2/2013 | Chung et al. | |
| 2013/0342783 A1* | 12/2013 | Kuo | G02B 6/0088 349/58 |
| 2016/0139329 A1* | 5/2016 | Sasaki | G02F 1/133308 362/613 |
| 2016/0363712 A1* | 12/2016 | Lee | G02B 6/0031 |

\* cited by examiner

LIQUID CRYSTAL DISPLAY AND BACKLIGHT MODULE THEREOF

BACKGROUND OF THE INVENTION

1. Field of the Invention

The present invention relates to the field of displays, and more particularly, to a backlight module and a liquid crystal display (LCD) using the backlight module.

2. Description of the Prior Art

An external light source is needed for a conventional thin Film transistor-liquid crystal display (TFT-LCD) to show images since the conventional TFT-LCD panel does not illuminate itself. There are two kinds of light sources in general, that is, backlight light source and reflective light source. Because backlight light source is not affected by the environment, the light source inside the conventional TFT-LCD is mostly the backlight light source.

Two kinds of light sources for the TFT-LCD backlight source are cold cathode fluorescent lamp (CCFL) and light emitting diode (LED). Because of the advantages of small in size, short response time, long life span, solidity, high color gamut, various types of packages, etc., LEDs have becomes the mainstream of the market.

Typically, the LED backlight source is divided into edge-lit LED backlight and direct-lit LED backlight.

To enhance resolution of displays, a quantum dot (QD) tube is arranged and fixed on the front of an LED when a backlight source is fabricated. Because of a restriction of machines, it is difficult to bend QD tubes and light guide plates (LGPs). That's why it is impossible to fabricate displays with a size over the jumbo size (i.e., the broad width of 100 inch).

SUMMARY OF THE INVENTION

An object of the present invention is to propose an LCD and a backlight module used in the LCD for resolving the problem that it is impossible to fabricate displays with a size over the jumbo size, that is, the broad width of 100 inch, since a QD tube and an LGP are difficult to bend due to restriction of machines.

According to the present invention, a backlight module comprises a bezel, a combinational backlight unit, an optical component, and a plurality of dot pattern reflectors. The combinational backlight unit is arranged on a lower portion inside the bezel. The combinational backlight unit comprises a plurality of sub-backlight units spliced at intervals. The optical component is arranged on an upper portion inside the bezel and placed on top of the combinational backlight unit at intervals. The plurality of dot pattern reflectors are arranged on top of the gap between the adjacent sub-backlight units, respectively for reducing reflectivity of light at the gap. Each of the plurality of sub-backlight units comprises a light guide plate, a circuit board, and a light source. The light guide plate (LGP) comprises an incident surface and a emitting surface. The emitting surface comprises microstructures. The circuit board is arranged on one side of the LGP and supporting the dot pattern reflector. The light source stuck on a lateral side of the circuit board and supplying the incident surface of the LGP with an incident light.

Furthermore, the light source comprises a light emitting diode (LED) stuck on the lateral side of the circuit board and a quantum dot (QD) tube arranged on an area between the LED and the LGP.

Furthermore, the optical component comprises a diffuser film arranged on top of the combinational backlight unit at intervals, and a support member comprising one terminal arranged on the LGP, and the other terminal jointing the diffuser film for supporting the diffuser film.

Furthermore, the height of the support member is 5 mm to 15 mm, and the diameter of a bottom of the support member is 2 mm to 4 mm.

Furthermore, the width of the support member becomes gradually smaller from bottom to top or from middle to two terminals.

Furthermore, the bezel comprises a bottom plate, two vertical members, a first extension member, and a second extension member. The bottom plate supports the combinational backlight unit. The two vertical members are disposed on two opposite sides of the bottom plate, respectively. The first extension member is arranged in the vertical members and extending horizontally for pressing and holding the LGP. The second extension member is arranged in the vertical member and extending horizontally for supporting the diffuser film.

Furthermore, the bezel further comprises an anchor post, and the anchor post is connected to the bottom plate and arranged on at least one side of the LGP.

Furthermore, the bezel further comprises a turn-lock portion for fixing the LGP. The turn-lock portion comprises a turning section rotated and arranged on the bottom plate, and a press-hold section connected to the turning section and locking the LGP on the bottom plate.

According to the present invention, a backlight module comprises a bezel, a combinational backlight unit, an optical component, and a plurality of dot pattern reflectors. The combinational backlight unit is arranged on a lower portion inside the bezel. The combinational backlight unit comprises a plurality of sub-backlight units spliced at intervals. The optical component is arranged on an upper portion inside the bezel and placed on top of the combinational backlight unit at intervals. The plurality of dot pattern reflectors are arranged on top of the gap between the adjacent sub-backlight units, respectively for reducing reflectivity of light at the gap.

Furthermore, each of the plurality of sub-backlight units comprises a light guide plate, a circuit board, and a light source. The light guide plate (LGP) comprises an incident surface and a emitting surface. The emitting surface comprises microstructures. The circuit board is arranged on one side of the LGP and supporting the dot pattern reflector. The light source stuck on a lateral side of the circuit board and supplying the incident surface of the LGP with an incident light.

Furthermore, the light source comprises a light emitting diode (LED) stuck on the lateral side of the circuit board and a quantum dot (QD) tube arranged on an area between the LED and the LGP.

Furthermore, the LED is a blue light LED.

Furthermore, the optical component comprises a diffuser film arranged on top of the combinational backlight unit at intervals, and a support member comprising one terminal arranged on the LGP, and the other terminal jointing the diffuser film for supporting the diffuser film.

Furthermore, the height of the support member is 5 mm to 15 mm.

Furthermore, the width of the support member becomes gradually smaller from bottom to top or from middle to two terminals.

Furthermore, the optical component further comprises a prism film, a brightness enhancement film, and a polarizer film arranged on the diffuser film at intervals.

Furthermore, the bezel comprises a bottom plate, two vertical members, a first extension member, and a second extension member. The bottom plate supports the combinational backlight unit. The two vertical members are disposed on two opposite sides of the bottom plate, respectively. The first extension member is arranged in the vertical members and extending horizontally for pressing and holding the LGP. The second extension member is arranged in the vertical member and extending horizontally for supporting the diffuser film.

According to the present invention, a liquid crystal display comprises the backlight module as mentioned above.

Compared with the conventional technology, the LCD and the backlight module used in the LCD proposed by the present invention have features as follows: A plurality of sub-backlight units are spliced at intervals for forming the conventional backlight unit with a large size, lessening the difficulty in bending the LGP in the display with a large curve screen, bringing merits of low costs, simple techniques, and good for manufacturing. The QD tube is disposed on the gap between adjacent sub-backlight units, so it is not necessary to fabricate the QD tube with an extremely large size, which is good for applying the QD tube to a display with an extremely large size and improving the brightness and contrast of high backlight. A dot pattern reflector is arranged on the top of the gap between adjacent sub-backlight units, which is good for reducing reflectivity of the mixed light at the gap, enhancing the scattering ratio of the mixed light at the gap, and improving evenness of emissive light from the backlight module.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
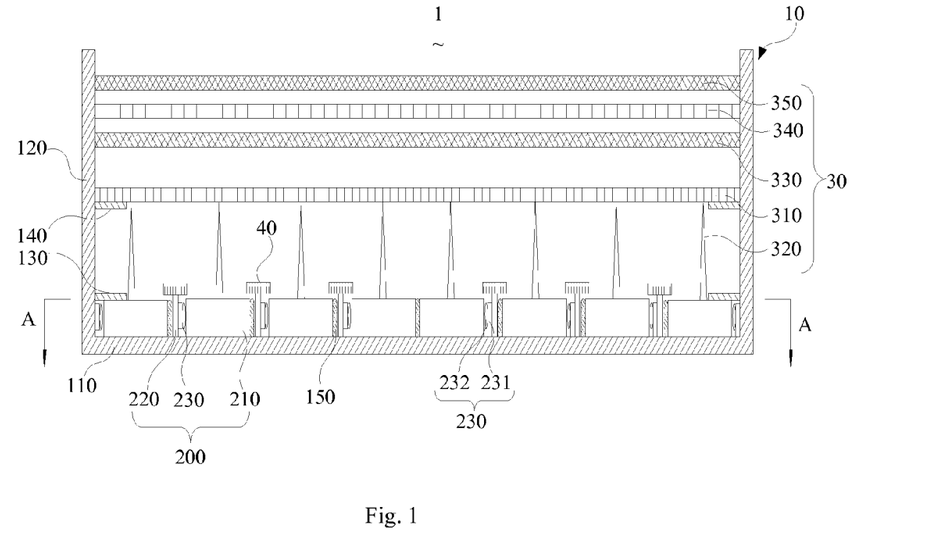
FIG. 1 is a cross sectional view of a backlight module according to one embodiment of the present invention.
Figure 2:
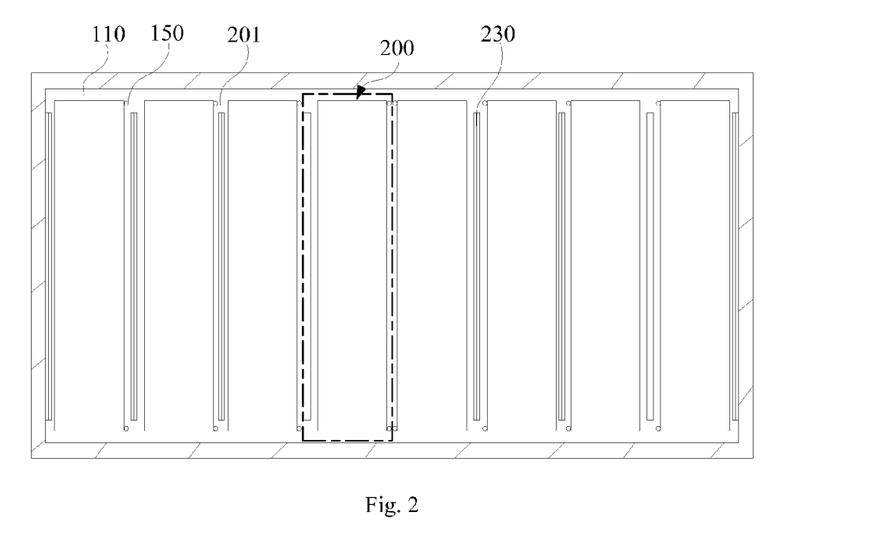
FIG. 2 is a cross-sectional view of the backlight module along a line A-A as shown in FIG. 1.

Please refer to FIG. 1. FIG. 1 is a schematic diagram of the structure of a backlight module 1 according to the present invention. FIG. 2 is a cross sectional view of the backlight module 1 along the line A-A.

The backlight module 1 comprises a bezel 10, a combinational backlight unit 20, an optical component 30, and a plurality of dot pattern reflectors 40.

The combinational backlight unit 20 is arranged on a lower portion inside the bezel 10. The combinational backlight unit 20 comprises a plurality of sub-backlight units 200 (referring to FIG. 2 where a component is highlighted with a dot-line box). The plurality of sub-backlight units 200 are spliced at intervals. The optical component 30 is arranged on an upper portion inside the bezel 10 and placed on the top of the combinational backlight unit 20 at intervals. The plurality of dot pattern reflectors 40 are arranged on the top of a gap 201 between adjacent sub-backlight units 200, respectively for reducing reflectivity of light at the gap 201.

Specifically, each of the plurality of sub-backlight units 200 comprises an LGP 210, a circuit board 220, and a light source 230.

Figure 3:
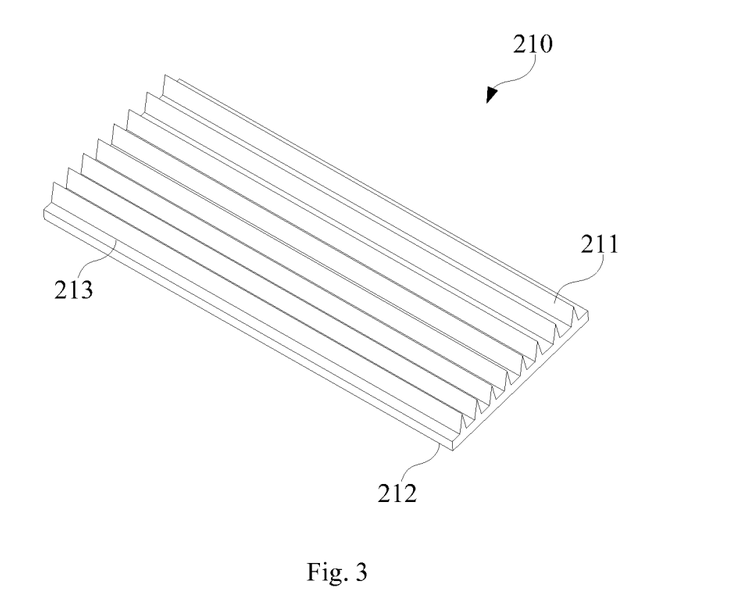
FIG. 3 shows a light guide plate of a backlight module of the backlight module as shown in FIG. 2.

The LGP 210 can be a commonly printed LGP or an LGP comprising a microstructure 211. Please refer to FIG. 3 as well. Specifically, FIG. 3 is a schematic diagram of the structure of the LGP 210 in the backlight module 1 as shown in FIG. 1. The LGP 210 comprises an incident surface 212 and a emitting surface 213. The microstructure 211 is arranged on the emitting surface 213. The microstructure 211 may be a strip-shaped triangle and arranged on the emitting surface 213 at intervals. Or, the microstructure 211 may be a wave-shaped triangle. Or, the microstructure 211 may be a strip- and wave-shaped triangle. The strips and waves form an alternative array or a crossing disposition.

The circuit board 220 is arranged on one side of the LGP 210 and supports the dot pattern reflector 40. The light source 230 is stuck on a lateral side of the circuit board 220 and supplying the LGP 210 with an incident light.

The light source 230 comprises an LED 231 and a QD tube 232. The LED 231 is stuck on a lateral side of the circuit board 220. The QD tube 232 is arranged on an area between the LED 231 and the LGP 210. The LED 231 is preferred to be a blue LED. It is notified that the light source 230 can be the LED 231 only; that is, the QD tube 232 is not necessary.

The optical component 30 comprises a diffuser film 310 and a support member 320. The diffuser film 310 is arranged on the top of the combinational backlight unit 20 at intervals. One terminal of the support member 320 is arranged on the LGP 210, and the other terminal of the support member 320 joints the diffuser film 310 for supporting the diffuser film 310. The support member 320 may be stuck on the emitting surface 213 with glue or may be fixed on the emitting surface 213 with a fixing hole. The fixing hole is arranged on the LGP 210 and matches the support member 320. The height of the support member 320 is 5 mm to 15 mm. The support member 320 may be a light guide with the effects of transparency and evenness. The light guide may be square or circular. The light guide comprises a bottom connected to the LGP 210 and a top connected to the diffuser film 310. The width or diameter of the bottom is 2 mm to 4 mm for preventing poor transparency occurring between the support member 320 and the diffuser film 310.

The width of the support member 320 becomes gradually smaller from bottom to top. Specifically, the width or diameter of the top of the light guide is smaller than 2 mm, preferably 0.1 mm, when the width or diameter of the bottom of the light guide is 2 mm. Further, to prevent poor transparency occurring between the support member 320 and the LGP 210, it is also possible that the width of the support member 320 becomes gradually smaller from the middle to the two terminals. Specifically, the width or diameter of the top and the bottom of the light guide is smaller than 2 mm, preferably 0.1 mm, when the width or diameter of the middle of the light guide is 2 mm. Or, the width or diameter of the top and the bottom of the light guide is smaller than 4 mm, preferably 1 mm, when the width or diameter of the middle of the light guide is 4 mm. The optical component 30 further comprises a prism film 330, a brightness enhancement film 340, and a polarizer film 350. The prism film 330, the brightness enhancement film 340, and the polarizer film 350 are successively arranged at intervals in a direction vertical to the diffuser film 310.

The dot pattern reflector 40 is fabricated from a reflector (not shown) and net dots (not shown) distributed on the reflector. There is mixed light at the gap 201 between the adjacent LGPs 210. The mixed light is dispersive light beams from the light source 230 and the LGPs 210. The light at the gap 201 is uneven due to the mixed light, so a reflector is arranged on the gap 201 in this embodiment for reflecting the dispersive light beams. Flare spots are generated on the reflector because of the dispersive light beams, so a plurality of net dots are disposed on the reflector for reducing reflectivity of the reflector on the net-dot area. Accordingly, the strength of light received by an area of the diffuser film 310 facing the light source 230 is reduced, and the scattering ratio of the area is enhanced. In this way, the strength of light output through the diffuser film 310 gets evener.

The bezel 10 comprises a bottom plate 110, two vertical members 120, a first extension member 130, and a second extension member 140, as FIG. 1 shows.

The bottom plate 110 supports the combinational backlight unit 20. Specifically, the LGPs 210 in the combinational backlight unit 20 are arranged on the bottom plate 110 at intervals. A gap 201 is formed on an area between adjacent LGPs 210. The circuit board 220 is set on the gap 201. The circuit board 220 comprises an upper terminal, a lower terminal, a left side, and a right side. The upper terminal of the circuit board 220 supports the dot pattern reflector 40. The lower terminal of the circuit board 220 is arranged on the bottom plate 110. The LED 231 is arranged on the left side or the right side. The QD tube 232 is arranged the bottom plate 110 between the LED 23 land LGP 210. It is also possible that the bezel 10 further comprises a support block (not shown). The support block is arranged on the bottom plate 110 for supporting the QD tube 232. The bottom plate 110 may be square or circular. When the bottom plate 110 is square, the two vertical members 120 are disposed on the two opposite terminals of the bottom plate 110, respectively. It is also possible that the vertical members 120 are disposed on the all sides of the bottom plate 110. When the bottom plate 110 is circular, the vertical members 120 are enclosed and arranged on the edges of the bottom plate 110. It is also possible that a bottom frame is substituted for the bottom plate 110. The two terminals of the LGP 210 are set up on the bottom frame for reducing the contact area between the LGP 210 and the bottom frame and improving the effect of heat radiation of the LGP 210.

Figure 4:
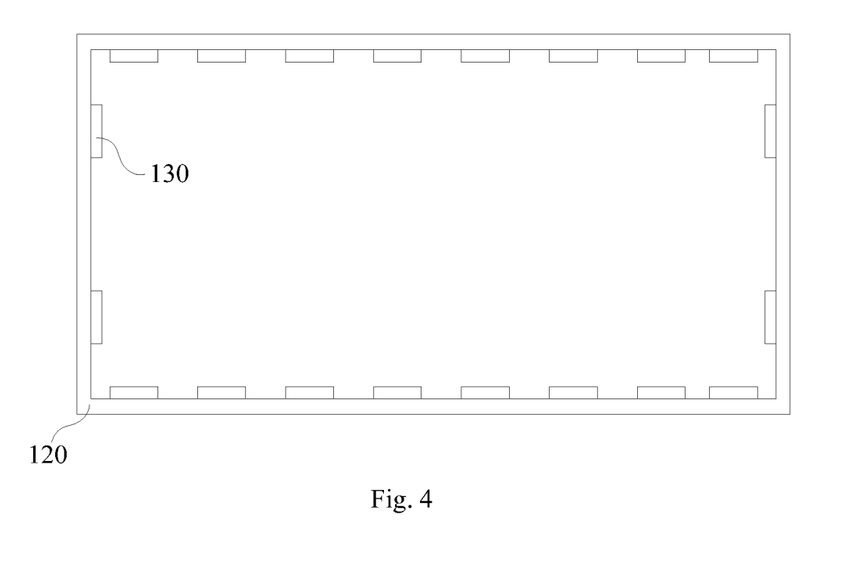
FIG. 4 is a top view of distribution of a first extension member as shown in FIG. 1 according to one embodiment of the present invention.

The first extension member 130 is arranged in the vertical member 120 and extends horizontally for pressing and holding the LGP 210. The first extension member 130 may be shaped like a square frame. The first extension member 130 may also be distributed on the vertical member 120 at intervals. Please refer to FIG. 4 as well. Specifically, FIG. 4 is a top view of distribution of a first extension member 130 as shown in FIG. 1 according to another embodiment of the present invention. At least two first extension members 130 are disposed on each vertical member 120 at intervals. At least one first extension member 130 is arranged on each of the two opposite terminals of the LGP 210. Preferably, a first extension member 130 is arranged on each of the two opposite terminals of the LGP 210.

The second extension member 140 is arranged in the vertical member 120 and extends horizontally for supporting the diffuser film 310. The second extension member 140 may be shaped like a square frame for supporting the edges of the diffuser film 310. The second extension member 140 may also be distributed on the vertical member 120 at intervals.

Further, the bezel 10 further comprises an anchor post 150. As FIG. 1 and FIG. 2 show, the anchor post 150 is connected to the bottom plate 110 and arranged on at least one side of the LGP 210 for preventing the LGP 210 from moving right or left. It is also possible to arrange the anchor post 150 on both sides of the LGP 210.

Further, the LGP 210 is fixed on the bottom plate 110 with a screw. Specifically, a through hole is disposed on both of the bottom plate 110 and the LGP 210. The screw penetrates the LGP 210 and the bottom plate 110 successively. The LGP 210 is locked on the bottom plate 110 with the screw and a matching nut.

Figure 5:
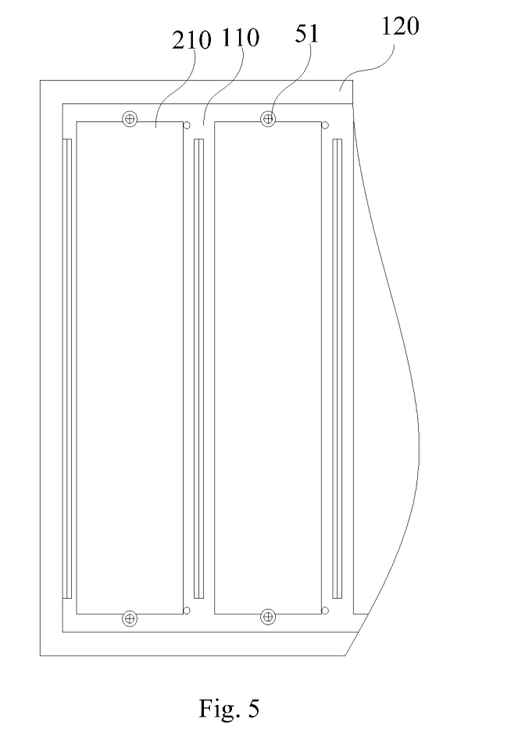
FIG. 5 is a cross sectional view of a bottom plate connecting the light guide plate as shown in FIG. 2 according to another embodiment of the present invention.

It is possible that no holes are arranged on the LGP 210 in other embodiments. Please refer to FIG. 5 as well. Specifically, FIG. 5 is a top view of a bottom plate of a bezel connected to an LGP 210 as shown in FIG. 2 in another embodiment. A screw comprises a nut 51 and a screw (not shown). The diameter of the nut 51 is more than two times of the diameter of the screw. It is only necessary to arrange fixing holes on the bottom plate 110 at intervals. The LGP 210 is arranged between adjacent fixing holes. Since the diameter of the nut 51 is more than two times of the diameter of the screw, the area of the nut 51 is large enough to press and hold a emitting surface 213 of the LGP 210. The screw penetrates the fixing hole and a matching nut, and the LGP 210 is fixed on the bottom plate 110.

Figure 6:
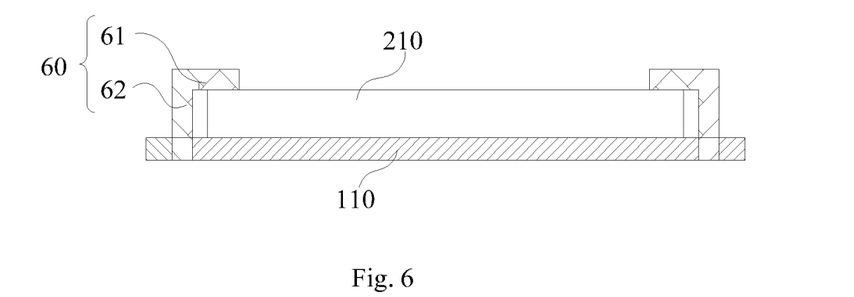
FIG. 6 is a left side view of a bottom plate connecting the light guide plate as shown in FIG. 1 according to another embodiment of the present invention.

Please refer to FIG. 6. FIG. 6 is a left view of a bottom plate 110 of a bezel connected to an LGP 210 as shown in FIG. 1 according to another embodiment of the present invention. It is also possible to not use any screws to fix the LGP 210; instead, a turn-lock portion 60 is arranged on the bottom plate 110. The turn-lock portion 60 comprises a press-hold section 61 and a turning section 62 connected to the press-hold section 61. The press-hold section 61 and the turning section 62 are connected to form the shape of 7. The turning section 62 is rotated and arranged on the bottom plate 110. The press-hold section 61 locks the LGP 210 on the bottom plate 110. Like the above-mentioned distribution of the first extension member, at least one turn-lock portion 60 is arranged on the opposite two terminals of each of the LGPs 210. Preferably, a turn-lock portion 60 is arranged on each of the two opposite terminals of the LGP 210.

The components of the structure of the backlight module 1 have been briefly introduced. An optical path of the backlight module 1 will be introduced in the following. Four optical paths are used in the present invention. The first optical path is that the excitement light is generated by the QD tube 232 after the QD tube 232 is excited by the emitting light from the LED 231. Then, the excitement light passes through the LGP 210, the diffuser film 310, the prism film 330, the brightness enhancement film 340, and the polarizer film 350 successively. The second optical path is that the excitement light is generated by the QD tube 232 after the QD tube 232 is excited by the emitting light from the LED 231. Then, the excitement light passes through the dot pattern reflector 40, the diffuser film 310, the prism film 330, the brightness enhancement film 340, and the polarizer film 350 successively. The third optical path is that the excitement light is generated by the QD tube 232 after the QD tube 232 is excited by the emitting light from the LED 231. Then, the excitement light passes through the LGP 210, the dot pattern reflector 40, the diffuser film 310, the prism film 330, the brightness enhancement film 340, and the polarizer film 350 successively. The fourth optical path is that the excitement light is generated by the QD tube 232 after the QD tube 232 is excited by the emitting light from the LED 231. Then, the excitement light passes through the LGP 210, the support member 320, the diffuser film 310, the prism film 330, the brightness enhancement film 340, and the polarizer film 350 successively.

Figure 7:
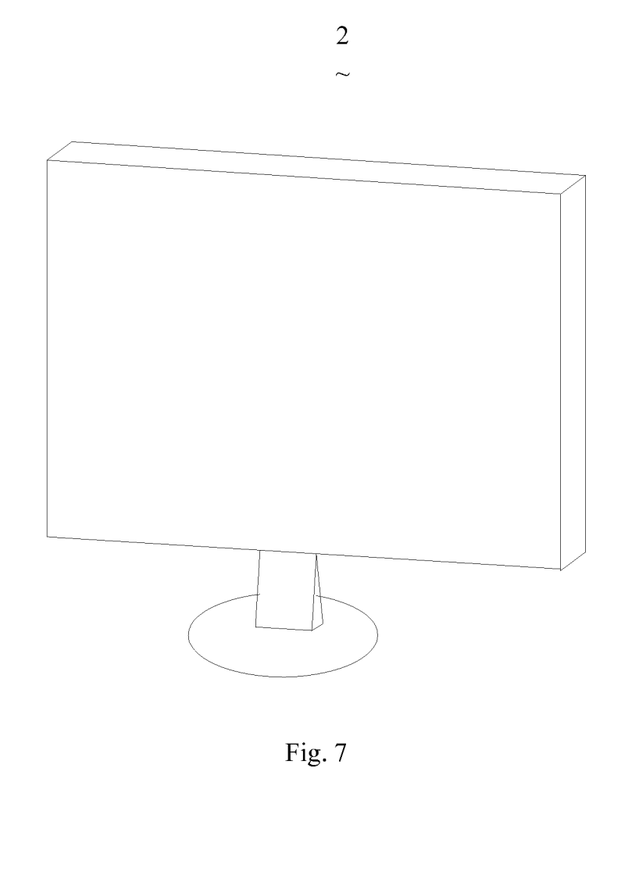
FIG. 7 shows an LCD device according to the present invention.

As FIG. 7 shows, the present invention further proposes an LCD 2. The LCD 2 comprises the above-mentioned backlight module.

The LCD and the backlight module 1 proposed by the present invention comprise at least four merits as follows:

(1) the conventional backlight unit with a large size is designed to be a plurality of sub-backlight units 200 spliced at intervals, lessening the difficulty in bending the LGP 210 in the display with a large curve screen;

(2) the single block sub-backlight units are spliced at intervals for forming the backlight unit with a large size, bringing merits of low costs, simple techniques, and good for manufacturing;

(3) the QD tube 232 is disposed on the gap 201 between adjacent sub-backlight units 200, so it is not necessary to fabricate the QD tube 232 with an extremely large size, which is good for applying the QD tube 232 to a display with an extremely large size and improving the brightness and contrast of high backlight;

(4) the dot pattern reflector 40 is arranged on the top of the gap 201 between adjacent sub-backlight units 200, which is good for reducing reflectivity of the mixed light at the gap 201, enhancing the scattering ratio of the mixed light at the gap 201, and improving evenness of emissive light from the backlight module 1.

Relative terms, such as "first" "second", "beneath", "below", "left", "right", and the like, may be used herein for ease of description to describe one element or feature's relationship to another element(s) or feature(s) as illustrated in the figures. It will be understood that the relative terms are intended to encompass different orientations of the device in use or operation in addition to the orientation depicted in the figures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight module, comprising:
a bezel;
a combinational backlight unit, arranged on a lower portion inside the bezel, and the combinational backlight unit comprising a plurality of sub-backlight units spliced at intervals;
an optical component, arranged on an upper portion inside the bezel and placed on top of the combinational backlight unit at intervals; and
a plurality of dot pattern reflectors, arranged on top of the gap between the adjacent sub-backlight units, respectively for reducing reflectivity of light at the gap; wherein
each of the plurality of sub-backlight units comprises:
a light guide plate (LGP), comprising an incident surface and an emitting surface, and the emitting surface comprising microstructures;
a circuit board, arranged on one side of the LGP and supporting the dot pattern reflector; and
a light source, stuck on a lateral side of the circuit board and supplying the incident surface of the LGP with an incident light.

2. The backlight module of claim 1, wherein the light source comprises:
a light emitting diode (LED), stuck on the lateral side of the circuit board;
a quantum dot (QD) tube, arranged on an area between the LED and the LGP.

3. A liquid crystal display comprising a backlight module as claimed in claim 1.

4. The backlight module of claim 2, wherein the optical component comprises:
a diffuser film, arranged on top of the combinational backlight unit at intervals;
a support member, comprising one terminal arranged on the LGP, and the other terminal jointing the diffuser film for supporting the diffuser film.

5. The backlight module of claim 4, wherein the height of the support member is 5 mm to 15 mm, and the diameter of a bottom of the support member is 2 mm to 4 mm.

6. The backlight module of claim 4, wherein the width of the support member becomes gradually smaller from bottom to top or from middle to two terminals.

7. The backlight module of claim 4, wherein the bezel comprises:
a bottom plate, supporting the combinational backlight unit;
two vertical members, disposed on two opposite sides of the bottom plate, respectively;
a first extension member, arranged in the vertical members and extending horizontally for pressing and holding the LGP; and
a second extension member, arranged in the vertical member and extending horizontally for supporting the diffuser film.

8. The backlight module of claim 7, wherein the bezel further comprises an anchor post, and the anchor post is connected to the bottom plate and arranged on at least one side of the LGP.

9. The backlight module of claim 7, wherein the bezel further comprises a turn-lock portion for fixing the LGP, and the turn-lock portion comprises:
a turning section, rotated and arranged on the bottom plate;
a press-hold section, connected to the turning section and locking the LGP on the bottom plate.

10. A backlight module, comprising:
a bezel;
a combinational backlight unit, arranged on a lower portion inside the bezel, and the combinational backlight unit comprising a plurality of sub-backlight units spliced at intervals;

an optical component, arranged on an upper portion inside the bezel and placed on top of the combinational backlight unit at intervals; and a plurality of dot pattern reflectors, arranged on top of the gap between the adjacent sub-backlight units, respectively for reducing reflectivity of light at the gap;

wherein each sub-backlight unit comprises:

a light guide plate (LGP), comprising an incident surface and an emitting surface, and the emitting surface comprising microstructures;

a circuit board, arranged on one side of the LGP and supporting the dot pattern reflector; and a light source, stuck on a lateral side of the circuit board and supplying the incident surface of the LGP with an incident light;

wherein the light source comprises:

a light emitting diode (LED), stuck on the lateral side of the circuit board; and a quantum dot (QD) tube, arranged on an area between the LED and the LGP.

11. The backlight module of claim 10, wherein the LED is a blue light LED.

12. A backlight module, comprising:

a bezel;

a combinational backlight unit, arranged on a lower portion inside the bezel, and the combinational backlight unit comprising a plurality of sub-backlight units spliced at intervals;

an optical component, arranged on an upper portion inside the bezel and placed on top of the combinational backlight unit at intervals; and a plurality of dot pattern reflectors, arranged on top of the gap between the adjacent sub-backlight units, respectively for reducing reflectivity of light at the gap;

wherein each sub-backlight unit comprises:

a light guide plate (LGP), comprising an incident surface and an emitting surface, and the emitting surface comprising microstructures;

a circuit board, arranged on one side of the LGP and supporting the dot pattern reflector; and a light source, stuck on a lateral side of the circuit board and supplying the incident surface of the LGP with an incident light;

wherein the optical component comprises:

a diffuser film, arranged on top of the combinational backlight unit at intervals; and a support member, comprising one terminal arranged on the LGP, and the other terminal jointing the diffuser film for supporting the diffuser film.

13. The backlight module of claim 12, wherein the optical component further comprises a prism film, a brightness enhancement film, and a polarizer film arranged over the diffuser film at intervals.

* * * * *